United States Patent
Park et al.

(10) Patent No.: US 11,339,923 B1
(45) Date of Patent: May 24, 2022

(54) PRESSURE VESSEL

(71) Applicant: SUNGWOO HITECH Co., LTD., Busan (KR)

(72) Inventors: Byung Hag Park, Busan (KR); Mun Jong Song, Yangsan-si (KR)

(73) Assignee: SUNGWOO HITECH CO., LTD., Busan (KR)

( * ) Notice: Subject to any disclaimer, the term of this patent is extended or adjusted under 35 U.S.C. 154(b) by 0 days.

(21) Appl. No.: 17/166,291

(22) Filed: Feb. 3, 2021

(30) Foreign Application Priority Data

Jan. 4, 2021 (KR) .......................... 10-2021-0000437

(51) Int. Cl.
*F17C 1/02* (2006.01)

(52) U.S. Cl.
CPC ........ *F17C 1/02* (2013.01); *F17C 2203/0604* (2013.01); *F17C 2209/2118* (2013.01); *F17C 2223/0123* (2013.01)

(58) Field of Classification Search
CPC ........ F17C 2209/221; F17C 2203/0658; F17C 1/02; F17C 2203/0604; F17C 2209/2118; F17C 2203/0123; B29C 66/54; B29C 65/06; B29C 65/1635; B29C 66/12464; B29C 66/612
USPC ......................................... 220/581, 680, 678
See application file for complete search history.

(56) References Cited

U.S. PATENT DOCUMENTS

| | | | | |
|---|---|---|---|---|
| 3,706,393 A | * | 12/1972 | Curtis | B65D 11/02 220/613 |
| 7,943,884 B2 | * | 5/2011 | Ishikawa | B29C 65/1654 219/121.64 |
| 2008/0187697 A1 | * | 8/2008 | Amano | B29C 66/65 428/35.7 |

FOREIGN PATENT DOCUMENTS

| | | | | |
|---|---|---|---|---|
| JP | 2010111036 A | * | 5/2010 | ....... B29C 66/12449 |
| JP | 2013119924 A | * | 6/2013 | |

* cited by examiner

*Primary Examiner* — John K Fristoe, Jr.
*Assistant Examiner* — Laura E. Parker
(74) *Attorney, Agent, or Firm* — Lex IP Meister, PLLC

(57) ABSTRACT

Disclosed is a pressure vessel including an upper liner portion including a top insertion-injection molded and coupled to a peripheral part of a boss portion in which a through hole extends in a vertical direction, extending downward cylindrically from the top to form a first accommodation space accommodating a fluid and having an open lower center, and including a first shape-matching portion in which a first overlapped-coupled surface is formed on a bottom end edge to be perpendicular to a laser emission direction and extends in a vertical direction along a circumferential direction and a lower liner portion having a top end edge coupled to the bottom end edge of the upper liner portion.

10 Claims, 2 Drawing Sheets

PRESSURE VESSEL

CROSS-REFERENCE TO RELATED APPLICATION

This application claims priority to and the benefit of Korean Patent Application No. 10-2021-0000437, filed on Jan. 4, 2021, the disclosure of which is incorporated herein by reference in its entirety.

BACKGROUND

1. Field of the Invention

The present invention relates to a pressure vessel, and more particularly, to a pressure vessel having improved sealing performance.

2. Discussion of Related Art

Generally, gas storage vessels are necessary to store a variety of types of gases such as hydrogen, nitrogen, natural gas, and the like and to discharge stored gases as necessary. Particularly, since gases are in low storage density in a vessel, it is necessary to store gases at high pressure. A pressure vessel utilized in such a high-pressure environment is necessary.

For example, alternative fuel gas vehicles including fuel cell vehicles or compressed natural gas vehicles have storage system structures which vary according to a storage method of fuel gases. Currently, in consideration of a cost, a weight, and simplicity of a storage system, a compressed gas type storage method has been in the spotlight. However, since a gaseous fuel has a low energy storage density, in order to secure more mileage, it is necessary to increase a storage amount or to increase a storage pressure. Particularly, in the case of a vehicle, since there is a limitation in increasing a size of a storage tank due to a limited gas storage system mounting space, it is very significant in a tank technique to safely store gases at a higher pressure.

Also, in the case of a composite tank among fuel gas storage tanks, in order to withstand an internal pressure generated by a compressed gas, a shell is reinforced using fiber-reinforced composites having high specific strength and specific stiffness and a liner configured to maintain gas tightness is inserted therein. Here, forms of fuel gas storage tanks are classified according to materials of liners. A tank in which a metallic liner such as aluminum is inserted is sorted as a type 3, and a tank in which a high-density polymer liner is inserted is sorted as a type 4.

In detail, the type 3 has relatively high stability but has disadvantages such as a high price and low fatigue resistance. On the other hand, in comparison to the type 3, the type 4 has advantages such as a low price and excellent fatigue resistance but has safety problems such as a leakage of hydrogen, decreasing transmission-resistant performance, and the like. Particularly, since a metallic nozzle applied to mount an external valve and a plastic material of a body differ from each other, soundness of air-tightness at a boss extension part is significant.

That is, even when a pressure vessel is manufactured using a plastic liner, it is necessary to use a metallic material or a non-metallic material, which differs from the liner, for a nozzle boss. Accordingly, there is a problem of degradation of adhesion between the metallic or non-metallic nozzle boss and the plastic liner which does not occur when a metallic liner is used.

Here, to redeem the above problems, a plastic clamp is generally used for clamping a plastic liner to a metallic nozzle boss. However, this causes another problem of a difficulty in installing the clamp in the plastic liner.

As another method, a method is used of forming a groove in a nozzle boss and insertion-molding the nozzle boss in the plastic liner. However, it is not easy to implement a perfect adhesion state.

Accordingly, it is urgent to research to prevent abnormal leakage of an internally accommodated fluid by increasing adhesion between a plastic liner and a metallic or nonmetallic nozzle boss.

Korean Patent Registration No. 10-1806643 is provided as a related art.

SUMMARY OF THE INVENTION

The present invention is directed to providing a pressure vessel having improved sealing performance.

According to an aspect of the present invention, there is provided a pressure vessel including an upper liner portion having a top insertion-injection molded and coupled to a peripheral part of a boss portion in which a through hole extends in a vertical direction, extending downward cylindrically from the top to form a first accommodation space accommodating a fluid and having an open lower center, and including a first shape-matching portion in which a first overlapped-coupled surface is formed on a bottom end edge to be perpendicular to a laser emission direction and extends in a vertical direction along a circumferential direction, and a lower liner portion having a top end edge coupled to the bottom end edge of the upper liner portion, including a second shape-matching portion in which a second overlapped-coupled surface is formed to extend in a vertical direction along a circumferential direction to be overlapped with and come into surface contact with the top end edge in a radial direction from the first overlapped-coupled surface, and in which a second accommodation space configured to communicate with the first accommodation space is formed.

According to another aspect of the present invention, there is provided a pressure vessel including an upper liner portion having a top insertion-injection molded and coupled to a peripheral part of a boss portion in which a through hole extends in a vertical direction, extending cylindrically downward from the top to form a first accommodation space accommodating a fluid therein in which a lower center is opened, and including a first shape-matching portion including an outer shape-matching protrusion extending downward from an outer end of a bottom end edge in a radial direction and having an inner surface on which a first overlapped-coupled surface perpendicular to a laser emission direction extends in a vertical direction along a circumferential direction, and a lower liner portion having a top end edge coupled to a bottom end edge of the upper liner portion, including a second shape-matching portion including an inner shape-matching protrusion extending upward from an inner end of the top end edge in a radial direction and having an outer surface on which a second overlapped-coupled surface overlapped and disposed internally in a radial direction from the first overlapped-coupled surface to come into surface contact therewith extends in a vertical direction along a circumferential direction, including the same material as the first shape-matching portion, having a color having a brightness lower than the first shape-matching portion, and in which a second accommodation space configured to communicate with the first accommodation space is formed.

According to still another aspect of the present invention, there is provided a pressure vessel including an upper liner portion having a top insertion-injection molded and coupled to a peripheral part of a boss portion in which a through hole extends in a vertical direction, extending cylindrically downward from the top to form a first accommodation space accommodating a fluid therein and in which a lower center is opened, and a first shape-matching portion including an outer shape-matching protrusion extending downward from an outer end of a bottom end edge in a radial direction and having an inner surface on which a first overlapped-coupled surface perpendicular to a laser emission direction extends in a vertical direction along a circumferential direction and an upper auxiliary protrusion primarily protruding toward a radial outside integrally along a circumferential direction of the outer shape-matching protrusion and secondarily extending downward with a length exceeding a bottom end of the outer shape-matching protrusion and including a third overlapped-coupled surface formed therein, and a lower liner portion including a top end edge coupled to the bottom end edge of the upper liner portion and a second shape-matching portion including an inner shape-matching protrusion extending upward from an inner end of the top end edge in a radial direction and having an outer surface on which a second overlapped-coupled surface is disposed to be overlapped and come into surface contact with the first overlapped-coupled surface internally in a radial direction and extends in a vertical direction along a circumferential direction, including a lower auxiliary protrusion having a top end in surface contact with the bottom end of the outer shape-matching protrusion and the second shape-matching portion having the same material as the first shape-matching portion and having a color having a brightness lower than the first shape-matching portion and including a fourth overlapped-coupled surface formed on an outer surface of a top facing a radial inside of the third overlapped-coupled surface, and in which a second accommodation space configured to communicate with the first accommodation space is formed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a pressure vessel according to an exemplary embodiment of the present invention will be described in detail with reference to the drawings.

Figure 1:
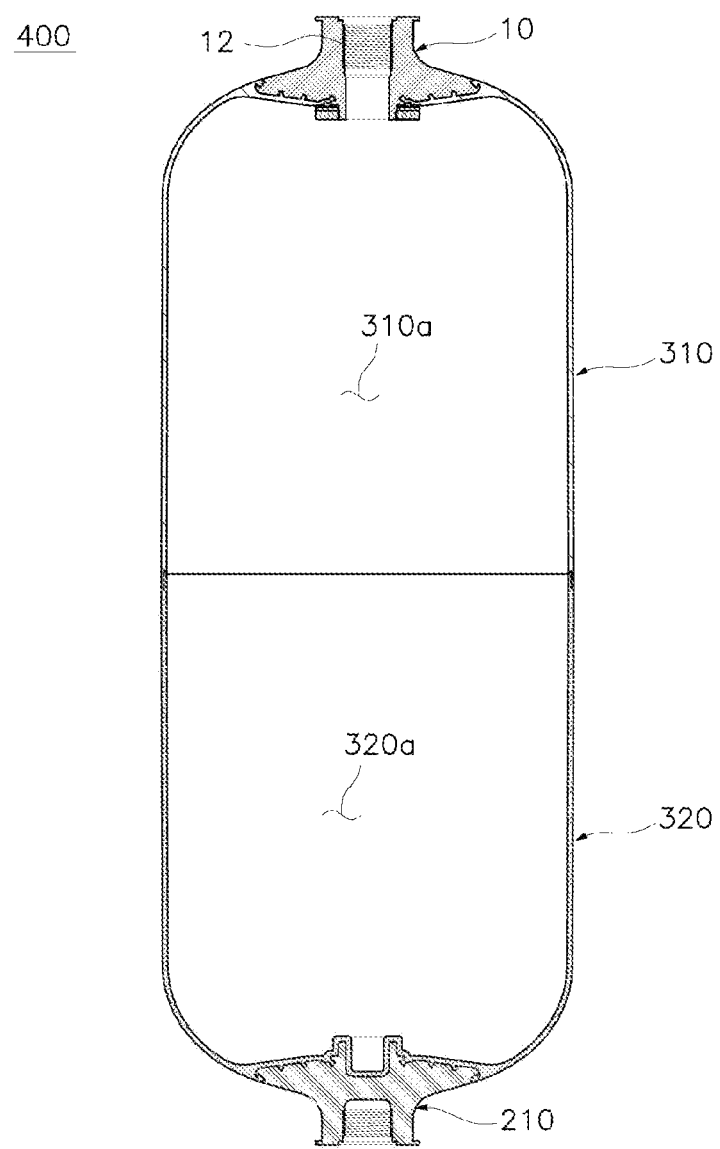
FIG. 1 is a cross-sectional view of a pressure vessel according to one embodiment of the present invention.
Figure 2:
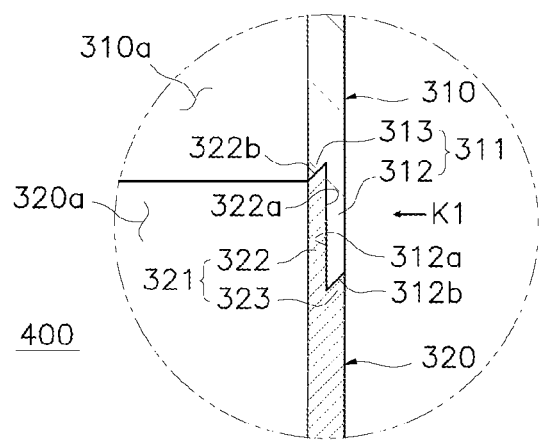
FIG. 2 is a cross-sectional view illustrating a boundary area between an upper liner portion and a lower liner portion in the pressure vessel according to one embodiment of the present invention.

FIG. 1 is a cross-sectional view of a pressure vessel according to one embodiment of the present invention, and FIG. 2 is a cross-sectional view illustrating a boundary area between an upper liner portion and a lower liner portion in the pressure vessel according to one embodiment of the present invention.

As shown in FIGS. 1 and 2, a pressure vessel 400 according to one embodiment of the present invention includes an upper liner portion 310 and a lower liner portion 320.

Here, the pressure vessel 400 is a vessel used for accommodating a variety of fluids such as oxygen, natural gas, nitrogen, hydrogen, and the like and may be provided to selectively suction and discharge one of the fluids repetitively. Here, the fluid may be stored in the pressure vessel 400 at a high pressure of 700 bars.

Meanwhile, a boss portion 10 may include a boss extension portion having a cylindrical shape and including a through hole 12 formed at a central part thereof to pass therethrough in a vertical direction. Also, the boss portion 10 may include a boss flange portion integrally expanding outward from a bottom of the boss extension portion in a radial direction along a circumferential direction and through which the through hole 12 extends in a vertical direction inside the radial direction.

Here, the boss extension portion and the boss flange portion are integrally formed and it may be understood that the boss extension portion is formed above the boss portion 10 and the boss flange portion is formed below the boss portion 10. Here, an outer surface of the boss extension portion may be formed to be recessed concavely inward in a radial direction along a circumferential direction from a top end toward the boundary area with the boss flange portion therebelow.

Also, a top surface of the boss flange portion may be formed to have a shape extending outward in a radial direction along a circumferential direction from the boundary area with the boss extension portion toward a bottom end. Here, the boss portion 10 including the boss extension portion and the boss flange portion may be manufactured by processing steel which is metallic, aluminum which is non-metallic, or the like but a material thereof is not limited thereto.

Also, the through hole 12 may be formed to pass through the boss extension portion and the boss flange portion along a vertical direction and may have a top end opened outward and a bottom end configured to communicate with a first accommodation space 310a inside the upper liner portion 310.

In addition, the through hole 12 may include a screw thread formed on an upper inner circumferential surface to be fastened to an external device (not shown) so as to prevent a leakage of a fluid when the fluid flows into or is discharged outward from the pressure vessel 400.

Meanwhile, the upper liner portion 310 is provided to have a container shape with an open bottom and may include the first accommodation space 310a configured to communicate with the through hole 12 to accommodate the fluid therein. Also, the upper liner portion 310 may have a top formed by insertion-injection molding along a bottom surface of the boss flange portion so as to be sealed and coupled.

Also, the lower liner portion 320 is provided to have a container shape with an open top and may include a second accommodation space 320a configured to communicate with the first accommodation space 310a to accommodate the fluid therein. Also, the lower liner portion 320 may have a bottom formed by insertion-injection molding along a top surface of a boss tail portion 210 so as to be sealed and coupled. Here, the boss tail portion 210 may include the same material as the boss portion 10. The boss tail portion 210 may include substantially the same material as the boss portion 10 and may have a minute difference in additives which should be understood as being included in the scope of the present invention.

Here, the upper liner portion 310 and the lower liner portion 320 may include synthetic resin materials different from those of the boss portion 10 and the boss tail portion 210. Here, a process of manufacturing the upper liner portion 310 will be described as an example. Here, a process of manufacturing the lower liner portion 320 should be understood as being substantially the same as the process of manufacturing the upper liner portion 310. For example, the boss portion 10 may be inserted between an upper mold (not shown) and a lower mold (not shown), and a separation space (not shown) may be formed between the upper mold and the lower mold to communicate with the boss portion 10. Subsequently, synthetic resin is injected into the separation space (not shown) and hardened so that the upper liner portion 310 may be manufactured through insertion-injection molding.

Also, the upper liner portion 310 and the lower liner portion 320 may be separately manufactured and coupled to each other through laser welding therebetween. Here, a bottom end edge of the upper liner portion 310 and a top end edge of the lower liner portion 320 may be fitted on and coupled to each other to be overlapped and may be coupled and melted to each other by lasers emitted from an outside in a radial direction.

In detail, referring to FIG. 2, a top of the upper liner portion 310 may be insertion-injection molded on and coupled to a peripheral part of the boss portion 10 from which the through hole 12 extends in a vertical direction.

Also, the upper liner portion 310 may cylindrically extend downward from the top coupled to the boss portion 10 and may have an open lower center so as to form the first accommodation space 310a which accommodates the fluid therein. Here, the first accommodation space 310a is formed inside the upper liner portion 310 in a radial direction.

Also, a first shape-matching portion 311 from which a first overlapped-coupled surface 312a perpendicular to a laser emission direction K1 extends in a vertical direction along a circumferential direction may be formed on the bottom end edge of the upper liner portion 310.

Here, the laser emission direction K1 means a direction in which lasers are emitted vertically from an outside in a radial direction along a circumferential direction toward an outer surface of a boundary area between the bottom end of the upper liner portion 310 and the top end of the lower liner portion 320.

Meanwhile, the top end edge of the lower liner portion 320 may be inserted into and coupled to the bottom end edge of the upper liner portion and then be coupled and melted through laser welding.

Here, a second shape-matching portion 321 on which a second overlapped-coupled surface 322a perpendicular to the laser emission direction K1 extends in a vertical direction along a circumferential direction may be formed on the top end edge of the lower liner portion 320.

Also, the second overlapped-coupled surface 322a may be overlapped with the first overlapped-coupled surface 312a in a radial direction to come into surface contact therewith. Here, in one embodiment of the present invention, a case in which the second overlapped-coupled surface 322a is disposed inside the first overlapped-coupled surface 312a in a radial direction is illustrated and described as an example but the present invention is not limited thereto. That is, as applicable, the second overlapped-coupled surface may be disposed outside the first overlapped-coupled surface in the radial direction.

Also, the second accommodation space 320a configured to communicate with the first accommodation space 310a may be formed inside the lower liner portion 320. In addition, a bottom of the lower liner portion 320 may be insertion-injection molded on and coupled to the peripheral part of the boss tail portion 210.

Meanwhile, the upper liner portion 310, the lower liner portion 320, the first shape-matching portion 311, and the second shape-matching portion 321 may, preferably, include the same materials. Here, the upper liner portion 310 and the lower liner portion 320 may, most preferably, include synthetic resin materials including polyamide.

Also, the upper liner portion 310, the lower liner portion 320, the first shape-matching portion 311, and the second shape-matching portion 321 may include substantially the same materials. The upper liner portion 310, the lower liner portion 320, the first shape-matching portion 311, and the second shape-matching portion 321 may have minute differences in additives in materials and may be understood as being included in the scope of the present invention.

Also, the first overlapped-coupled surface 312a may be disposed outside the second overlapped-coupled surface 322a in the radial direction, and the first shape-matching portion 311 may have a color having a brightness that is higher than the second shape-matching portion 321.

Here, an entirety of the upper liner portion 310 may, most preferably, have a color having a brightness higher than the lower liner portion 320. As applicable, only the first shape-matching portion 311 may partially have the color having the brightness that is higher than the second shape-matching portion 321.

For example, the first shape-matching portion 311 may have a white color to transmit lasers, and the second shape-matching portion 321 may have a black color so that an outer surface thereof absorbs heat to be heated and melted when the lasers are emitted theretoward. Otherwise, the first shape-matching portion 311 may have a transparent color, and the second shape-matching portion 321 may have the black color.

Accordingly, when lasers are transmitted and reach the second overlapped-coupled surface 322a in surface contact with the first overlapped-coupled surface 312a from an outside in a radial direction along a circumferential direction, weld-coupling may be performed between the first overlapped-coupled surface 312a and the second overlapped-coupled surface 322a.

Accordingly, while having the same materials, the first shape-matching portion 311 having the white color or the transparent color having the brightness higher than the second shape-matching portion 321 having the black color is overlapped with the second shape-matching portion 321 along a radial direction. Accordingly, since the weld-coupling is precisely performed when the lasers transmitted through the second overlapped-coupled surface in surface contact with the first overlapped-coupled surface 312a are absorbed and heated, working convenience may be notably improved.

Meanwhile, referring to FIG. 2, the first shape-matching portion 311 may include an outer shape-matching protrusion 312 extending downward from an outer end of the bottom end edge of the upper liner portion 310 in a radial direction and including the first overlapped-coupled surface 312a formed on an inner surface thereof.

Also, the second shape-matching portion 321 may include an inner shape-matching protrusion 322 extending upward from an inner end of the top end edge of the lower liner portion 320 in a radial direction and including the second overlapped-coupled surface 322a formed on an outer surface thereof and in surface contact with the first overlapped-coupled surface 312a.

Accordingly, the outer shape-matching protrusion 312 and the inner shape-matching protrusion 322 may be overlapped and fitted on and coupled to each other in a radial direction along a circumferential direction. Here, the first overlapped-coupled surface 312a and the second overlapped-coupled surface 322a come into surface contact with each other and are coupled and melted to each other by lasers while being aligned to be perpendicular to the laser emission direction K1.

Here, when a coupled surface coupled and melted by lasers is formed to be tapered without being set to be perpendicular to the laser emission direction K1 like a conventional case, a fused area may be formed to be uneven according to a thickness of the coupled surface in a welding process.

On the other hand, the first overlapped-coupled surface 312a formed on an inner surface of the outer shape-matching protrusion 312 and the second overlapped-coupled surface 322a formed on an outer surface of the inner shape-matching protrusion 322 are overlapped with and come into surface contact with each other along the radial direction. Also, the first overlapped-coupled surface 312a and the second overlapped-coupled surface 322a are formed to be perpendicular to the laser emission direction K1. Accordingly, since a welded-coupled area between the first overlapped-coupled surface 312a and the second overlapped-coupled surface 322a, which are in surface contact with each other, is uniformly formed along a vertical direction, sealing performance may be notably improved.

Also, the first overlapped-coupled surface 312a and the second overlapped-coupled surface 322a, which come into surface contact with each other and extend in a vertical direction along a circumferential direction, are formed to be perpendicular to the laser emission direction K1. Accordingly, since an additional device configured to deflect lasers for weld-coupling is not required, working convenience and productivity may be notably improved.

In addition, the outer shape-matching protrusion 312 and the inner shape-matching protrusion 322 are overlapped and coupled in a radial direction along a circumferential direction, and the first overlapped-coupled surface 312a and the second overlapped-coupled surface 322a extend in a vertical direction. Accordingly, a reactive force is generated by expansion of the fluid stored in the pressure vessel 400 so that pressurization and pressing are performed in directions facing each other so that a sealing force may be notably increased. That is, the inner shape-matching protrusion 322 may be pressurized outward, by an expansion pressure of the fluid, in a radial direction, and the outer shape-matching protrusion 312 may be pressurized inward, by a reactive force, in a radial direction.

Meanwhile, a first outer tilted surface 312b which narrows and tilts internally toward an end in a radial direction may be formed on an outer surface of a bottom end of the outer shape-matching protrusion 312. In addition, a first inner tilted surface 322b which narrows and tilts externally toward an end in a radial direction may be formed on an inner surface of a top end of the inner shape-matching protrusion 322.

Also, the first shape-matching portion 311 may include an inner tilted protrusion 313 which extends downward from an inner end of the bottom end edge of the upper liner portion 310 in a radial direction and has an outer surface narrowing to be tilted internally toward an end in a radial direction.

Here, the inner tilted protrusion 313 may be formed to be bent from a top end of the first overlapped-coupled surface 312a. That is, an angle between the first overlapped-coupled surface 312a and a tilted outer surface of the inner tilted protrusion 313 may be set to be more than 0° and less than 90°. Here, the outer shape-matching protrusion 312 may extend downward by a length exceeding a bottom end of the inner tilted protrusion 313.

Also, the second shape-matching portion 321 may include an outer tilted protrusion 323 which extends upward from an outer end of the top end edge of the lower liner portion 320 in a radial direction and has an inner surface narrowing to be tilted externally toward an end in a radial direction.

Here, the outer tilted protrusion 323 may be formed to be bent from a bottom end of the second overlapped-coupled surface 322a. That is, an angle between the second overlapped-coupled surface 322a and a tilted inner surface of the outer tilted protrusion 323 may be set to be more than 0° and less than 90°. Here, the inner shape-matching protrusion 322 may extend upward by a length exceeding a top end of the outer tilted protrusion 323.

Also, the tilted outer surface of the inner tilted protrusion 313 may face and be shape-matched with the first inner tilted surface 322b while the tilted inner surface of the outer tilted protrusion 323 simultaneously faces and is shape-matched with the first outer tilted surface 312b. Here, a boundary between cross sections which face and are shape-matched with each other may be formed to have a Z shape. That is, the tilted inner surface of the outer tilted protrusion 323 is fitted on and coupled to face and be shape-matched with the first outer tilted surface 312b formed on an outer surface of the bottom end of the outer shape-matching protrusion 312 and narrowing to be tilted internally toward the end in a radial direction.

Simultaneously, the tilted outer surface of the inner tilted protrusion 313 is fitted on and coupled to face and be shape-matched with the first inner tilted surface 322b formed on an inner surface of the top end of the inner shape-matching protrusion 322 and narrowing to be tilted internally toward the end in a radial direction. Accordingly, since movement in a radial direction is minimized during weld-coupling through laser emission, a coupled area may be uniformly formed and manufacturing precision may be significantly improved.

Figure 3:
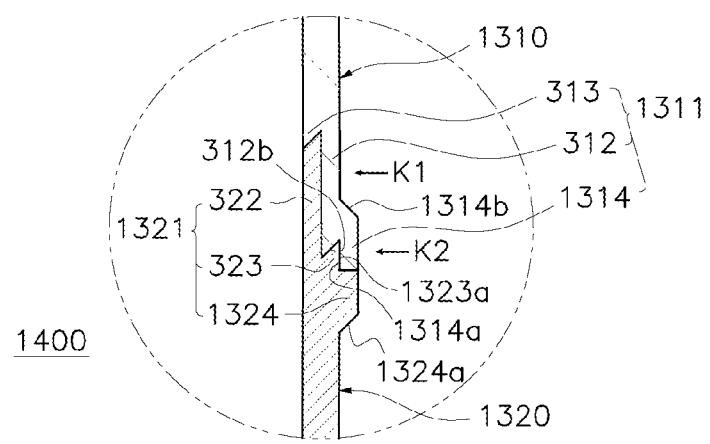
FIG. 3 is a cross-sectional view illustrating a modified example of the boundary area between the upper liner portion and the lower liner portion in the pressure vessel according to one embodiment of the present invention.

Meanwhile, FIG. 3 is a cross-sectional view illustrating a modified example of the boundary area between the upper liner portion and the lower liner portion in the pressure vessel according to one embodiment of the present invention. In the modified example, since basic components excluding an upper auxiliary protrusion 1314 and a lower auxiliary protrusion 1324 are equal to those of the above-described one embodiment, a detailed description will be omitted and like elements will be referred to as like reference numerals.

As shown in FIG. 3, a pressure vessel 1400 according to the modified example of the present invention includes an upper liner portion 1310 and a lower liner portion 1320. Here, since materials and colors of the upper liner portion 1310 and the lower liner portion 1320 are equal to those of the above-described one embodiment, a detailed description thereof will be omitted. Also, it may be understood that materials and colors of the upper auxiliary protrusion 1314 and the lower auxiliary protrusion 1324 are equal to the materials and the colors of the upper liner portion 1310 and the lower liner portion 1320, respectively.

Here, the upper liner portion 1310 may include a first shape-matching portion 1311 including the outer shape-matching protrusion 312. Also, the lower liner portion 1320 may include a second shape-matching portion 1321 including the outer tilted protrusion 323.

In detail, the first shape-matching portion 1311 may include the upper auxiliary protrusion 1314 primarily protruding outward from an outer surface of the bottom end of the outer shape-matching protrusion 312 integrally in a radial direction along a circumferential direction. Here, the upper auxiliary protrusion 1314 may secondarily extend downward by a length exceeding the bottom end of the outer shape-matching protrusion 312.

Here, an upper tilted surface 1314b expanding to be tilted toward a bottom end externally in a radial direction may be formed on an outer surface of a top of the upper auxiliary protrusion 1314. In addition, an outer surface of a bottom of the upper auxiliary protrusion 1314 may linearly extend downward from a bottom end of the upper tilted surface 1314b in a vertical direction along a circumferential direction.

Also, a third overlapped-coupled surface 1314a in surface contact with an outer surface of a top of the lower liner portion 1320 may be formed on an inner surface of the upper auxiliary protrusion 1314 to extend in a vertical direction along a circumferential direction and perpendicular to a laser emission direction K2.

Here, a top end of the third overlapped-coupled surface 1314a may be formed to be bent from an outer end of the first outer tilted surface 312b in a radial direction which is formed at the bottom end of the outer shape-matching protrusion 312. That is, an angle between the third overlapped-coupled surface 1314a and the first outer tilted surface 312b may be set to be more than 0° and less than 90°. Also, the laser emission directions K1 and K2 shown in FIG. 3 may be understood as being set to be mutually horizontal and as directions in which lasers are separately emitted from positions spaced apart from each other in a vertical direction.

Meanwhile, the second shape-matching portion 1321 may include the lower auxiliary protrusion 1324 protruding outward from an outer surface of a top of the lower liner portion 1320 integrally in a radial direction along a circumferential direction. Here, a top surface of the lower auxiliary protrusion 1324 may come into surface contact with a bottom surface of the upper auxiliary protrusion 1314.

Here, a lower tilted surface 1324a expanding to be tilted toward a top end externally in a radial direction may be formed on an outer surface of a bottom of the lower auxiliary protrusion 1324. In addition, an outer surface of a top of the lower auxiliary protrusion 1324 may linearly extend downward from a top end of the lower tilted surface 1324b in a vertical direction along a circumferential direction. Here, the outer surface of the bottom of the upper auxiliary protrusion 1314 and the outer surface of the top of the lower auxiliary protrusion 1324 may be set to have diameters corresponding to each other to form a continuous-lined outer surface.

Also, a fourth overlapped-coupled surface 1323a may be formed on the outer surface of the top of the lower liner portion 1320 facing an inside of the third overlapped-coupled surface 1314a in a radial direction to extend in a vertical direction along a circumferential direction and perpendicular to the laser emission direction K2. Here, the fourth overlapped-coupled surface 1323a may come into surface contact with and be pressed against the third overlapped-coupled surface 1314a.

Here, the third overlapped-coupled surface 1314a may be formed on the inner surface of the upper auxiliary protrusion 1314 while the fourth overlapped-coupled surface 1323a may be formed on the outer surface of the top end of the outer tilted protrusion 323 facing the third overlapped-coupled surface 1314a. Also, a bottom end of the fourth overlapped-coupled surface 1323a may be formed to be vertically bent from the top surface of the lower auxiliary protrusion 1324.

Accordingly, the bottom surface of the upper auxiliary protrusion 1314 primarily protruding outward and secondarily extending downward from the bottom end of the outer shape-matching protrusion 312 may come into surface contact with the top surface of the lower auxiliary protrusion 1324 protruding outward from the outer surface of the top of the lower liner portion 1320.

Simultaneously, the third overlapped-coupled surface 1314a on the inner surface of the upper auxiliary protrusion 1314 and the third overlapped-coupled surface 1314a, which faces the third overlapped-coupled surface 1314a, on the outer surface of the top of the lower liner portion 1320 come into surface contact with and are pressed against each other to be welded and coupled.

Accordingly, a welded-coupled area is formed not only between the first overlapped-coupled surface 312a (refer to FIG. 2) and the second overlapped-coupled surface 322a of FIG. 2 but also between the third overlapped-coupled surface 1314a and the fourth overlapped-coupled surface 1323a.

Accordingly, sealing performance may be reinforced even when a gap is generated between the outer shape-matching protrusion 312 and the outer tilted protrusion 323 due to an assembling error generated while the first shape-matching portion 1311 and the second shape-matching portion 1321 are fitted on and coupled to each other.

According to the embodiment of the present invention, effects are provided as follows.

First, when a first shape-matching portion and a second shape-matching portion, which include the same materials, the first shape-matching portion having a white or transparent color having a brightness higher than the second shape-matching portion having a black color, are overlapped with each other in a radial direction, since lasers transmitted through a second overlapped-coupled surface in surface contact with a first overlapped-coupled surface are absorbed and heated so that weld-coupling is precisely performed, working convenience may be notably improved.

Second, since the first overlapped-coupled surface formed on an inner surface of an outer shape-matching protrusion on a bottom end edge of an upper liner portion and the second overlapped-coupled surface formed on an outer surface of an inner shape-matching protrusion on a top end edge of a lower liner portion are overlapped with each other along a radial direction and come into surface contact with each other while being formed to be perpendicular to a laser emission direction so as to uniformly form a welded-coupled area, sealing performance may be notably improved.

Third, since the outer shape-matching protrusion and the inner shape-matching protrusion are overlapped and coupled to each other in a radial direction along a circumferential direction and the first overlapped-coupled surface and the second overlapped-coupled surface extend in a vertical direction, a reactive force is generated by a pressure caused by expansion of a fluid stored in a pressure vessel, and pressurization and pressing are performed in directions facing each other so that a sealing force may be notably increased.

Fourth, since the first overlapped-coupled surface and the second overlapped-coupled surface, which come into surface contact with each other and extend in a vertical direction along a circumferential direction, are formed to be perpendicular to the laser emission direction, an additional device configured to deflect lasers for weld-coupling is not necessary so that working convenience and productivity may be notably improved.

Fifth, since movement in a radial direction is minimized when a first outer tilted surface tilted from an outer surface of a bottom end of the outer shape-matching protrusion faces and is shape-matched with a tilted inner surface of an outer tilted protrusion to be welded and coupled to each other and a first inner tilted surface tilted from an inner surface of a top end of the inner shape-matching protruding faces and is shape-matched with a tilted outer surface of an inner tilted protrusion to be welded and coupled to each other, a coupled area may be uniformly formed and manufacturing precision may be notably improved.

Sixth, when a third overlapped-coupled surface of an inner surface of an upper auxiliary protrusion primarily protruding outward and secondarily extending from a bottom end of the outer shape-matching protrusion comes into surface contact with and is pressured against a fourth overlapped-coupled surface of an outer surface of a top of the lower liner portion to be welded and coupled to each other, a welded-coupled area is formed doubly so that airtight performance may be stably reinforced even when a gap is generated by an assembling error.

As described above, the present invention is not limited to the above-described embodiments and may be modified by one of ordinary skill in the art without departing from the scope of the claims of the present invention and such modifications are included within the scope of the present invention.

What is claimed is:

1. A pressure vessel comprising:
   an upper liner portion having a top insertion-injection molded and coupled to a peripheral part of a boss portion in which a through hole extends in a vertical direction, the upper liner portion extending downward cylindrically from the boss portion to form a first accommodation space accommodating a fluid and having an open lower center, and comprising a bottom end edge which includes a first shape-matching portion having a first overlapped-coupled surface which is perpendicular to a laser emission direction and extends in a vertical direction along a circumferential direction; and
   a lower liner portion comprising a top end edge which includes a second shape-matching portion having a second overlapped-coupled surface which extends in a vertical direction along a circumferential direction and overlaps the first overlapped coupled surface in a radial direction, wherein a second accommodation space configured to communicate with the first accommodation space is formed in the lower liner,
   wherein the first shape-matching portion comprises an outer shape-matching protrusion extending downward at an outer portion of the upper liner portion in a radial direction and the first overlapped-coupled surface is formed on an inner surface of the outer shape-matching protrusion,
   wherein the second shape-matching portion comprises an inner shape-matching protrusion extending upward at an inner portion of the lower liner portion in a radial direction, and the second overlapped-coupled surface in surface contact with the first overlapped-coupled surface is formed on an outer surface of the inner shape-matching protrusion,
   wherein the first shape-matching portion comprises an upper auxiliary protrusion primarily protruding integrally outward from the outer shape-matching protrusion in a radial direction along a circumferential direction and secondarily extending downward by a length exceeding a bottom end of the outer shape-matching protrusion, and
   wherein the second shape-matching portion comprises a lower auxiliary protrusion integrally protruding outward from an outer surface of the lower liner portion in a radial direction along a circumferential direction and having a top surface coming into surface contact with a bottom surface of the upper auxiliary protrusion.

2. The pressure vessel of claim 1, wherein the first shape-matching portion and the second shape-matching portion include the same materials while the first overlapped-coupled surface is disposed outside the second overlapped-coupled surface in a radial direction, and
   wherein the first shape-matching portion has a color having a brightness higher than that of the second shape-matching portion so as to allow lasers to be transmitted through and reach the second overlapped-coupled surface in surface contact with the first overlapped-coupled surface from an outside in a radial direction along a circumferential direction.

3. The pressure vessel of claim 2, wherein the first shape-matching portion has a white color, and the second shape-matching portion has a black color.

4. The pressure vessel of claim 2, wherein the first shape-matching portion has a transparent color, and the second shape-matching portion has a black color.

5. The pressure vessel of claim 2, wherein the upper liner portion and the lower liner portion include synthetic resin materials comprising polyamide.

6. The pressure vessel of claim 1, wherein a first outer tilted surface tilted internally in a radial direction is formed on an outer surface of the bottom end of the outer shape-matching protrusion, and
   wherein a first inner tilted surface tilted externally in a radial direction is formed on an inner surface of a top end of the inner shape-matching protrusion.

7. The pressure vessel of claim 6, wherein the first shape-matching portion comprises an inner tilted protrusion extending downward at an inner portion of the upper liner portion in a radial direction and having a second outer tilted surface tilted internally in a radial direction, and
   wherein the inner tilted protrusion is formed to be at an angle more than 0° and less than 90° from the first overlapped-coupled surface, and the second outer tilted surface faces and is shape-matched with the first inner tilted surface, and
   wherein the outer shape-matching protrusion extends downward by a length exceeding an end of the inner tilted protrusion.

8. The pressure vessel of claim 6, wherein the second shape-matching portion comprises an outer tilted protrusion extending upward at an outer portion of the lower liner portion in a radial direction and having a second inner tilted surface tilted externally in a radial direction, and wherein the outer tilted protrusion is formed to be at an angle more than 0° and less than 90° from the second overlapped-coupled surface, and the second inner tilted surface faces and is shape-matched with the first outer tilted surface, and wherein the inner shape-matching protrusion is set to have a length corresponding to the outer shape-matching protrusion and extends upward by a length exceeding an end of the outer tilted protrusion.

9. The pressure vessel of claim 1, wherein a third overlapped-coupled surface in surface contact with the outer surface of the top of the lower liner portion is formed on an inner surface of the upper auxiliary protrusion to extend in a vertical direction along a circumferential direction and perpendicular to the laser emission direction, and wherein a fourth overlapped-coupled surface is formed on the outer surface of the top of the lower liner portion facing an inside of the third overlapped-coupled surface in a radial direction to extend in a vertical direction along a circumferential direction.

10. The pressure vessel of claim 9, wherein a top end of the third overlapped-coupled surface is formed to be at an angle more than 0° and less than 90° from a radial outer end of a first outer tilted surface formed on a bottom end of the outer shape-matching protrusion, and wherein a bottom end of the fourth overlapped-coupled surface is formed to be vertically bent from a top surface of the lower auxiliary protrusion.

\* \* \* \* \*